United States Patent
Billingham et al.

(10) Patent No.: US 9,375,655 B2
(45) Date of Patent: Jun. 28, 2016

(54) DISTILLATION METHOD AND STRUCTURED PACKING

(75) Inventors: John Billingham, Getzville, NY (US); Guang X. Chen, Williamsville, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 1 day.

(21) Appl. No.: 13/981,924

(22) PCT Filed: Jan. 13, 2012

(86) PCT No.: PCT/US2012/021197
§ 371 (c)(1),
(2), (4) Date: Jul. 26, 2013

(87) PCT Pub. No.: WO2012/102876
PCT Pub. Date: Aug. 2, 2012

(65) Prior Publication Data
US 2013/0313103 A1   Nov. 28, 2013

Related U.S. Application Data

(60) Provisional application No. 61/436,699, filed on Jan. 27, 2011.

(51) Int. Cl.
*B01D 3/28*    (2006.01)
*B01J 19/32*   (2006.01)
*F25J 3/04*    (2006.01)

(52) U.S. Cl.
CPC . *B01D 3/28* (2013.01); *B01J 19/32* (2013.01); *F25J 3/04909* (2013.01);
(Continued)

(58) Field of Classification Search
CPC ............. B01J 19/32; B01J 2219/32491; B01J 2219/3325; B01J 2219/3221; B01J 2219/32425; B01J 2219/32408; B01D 3/28; F25J 3/04909; F25J 2290/20; F25J 2290/44

USPC ............... 261/94, 100, 101, 103, 106, 112.1, 261/112.2; 502/527.2, 527.22, 527.24; 203/72, 86, 89
See application file for complete search history.

(56) References Cited

U.S. PATENT DOCUMENTS

3,458,338 A * 7/1969 Adams et al. ............... 428/316.6
3,670,478 A   6/1972 Welsh et al.
(Continued)

FOREIGN PATENT DOCUMENTS

CN      101555138 A      4/2008
DE      102 08 711 A1    9/2003
DE      10 2006 060 806 A1  6/2008

OTHER PUBLICATIONS

Levêque, Julien and Rouzineau, David and Prevost, Michel and Meyer, Michel, Hydrodynamic and mass transfer efficiency of ceramic foam packing applied to distillation, Chemical Engineering Science, vol. 64, No. 11 (Jun. 1, 2009), pp. 2607-2616.*

(Continued)

*Primary Examiner* — Prem C Singh
*Assistant Examiner* — Brandi M Doyle
(74) *Attorney, Agent, or Firm* — Robert J. Hampsch; David M. Rosenblum (57) ABSTRACT

A method of conducting a distillation process and a cross-corrugated structured packing for use in such a process in which ascending vapor phases and descending liquid phases are contacted in such packing. The cross-corrugated structured packing contains corrugated sheets fabricated of an open cell foam-like material. The liquid phase produces a liquid film descending along struts forming cells of the material and the vapor phase ascends within the cross-corrugated structured packing and enters the cells and contacts the liquid film. The cross-corrugated structured packing is configured such that a superficial velocity at which ambient air would flow through the cross-corrugated structured packing at a pressure drop of 0.3" wc/ft is no greater than 20 times a reference superficial velocity at which the ambient air would flow through the foam-like material making up the corrugated sheets at the same pressure drop to ensure that vapor enters the cells of the foam-like material.

8 Claims, 4 Drawing Sheets

(52) U.S. Cl.
CPC .............. *B01J 2219/3221* (2013.01); *B01J 2219/32408* (2013.01); *B01J 2219/32425* (2013.01); *B01J 2219/32491* (2013.01); *B01J 2219/3325* (2013.01); *F25J 2290/20* (2013.01); *F25J 2290/44* (2013.01)

(56) References Cited

U.S. PATENT DOCUMENTS

| | | |
|---|---|---|
| 4,251,239 A | 2/1981 | Clyde et al. |
| 5,417,938 A | 5/1995 | Shelden et al. |
| 6,375,905 B1 | 4/2002 | Moini et al. |
| 2003/0094713 A1* | 5/2003 | Sunder et al. .............. 261/112.2 |
| 2004/0031495 A1* | 2/2004 | Steinberg .................. A24F 1/00 131/194 |
| 2010/0243520 A1 | 9/2010 | Glover et al. |

OTHER PUBLICATIONS

J. Leveque et al., "Hydrodynamic and mass transfer efficiency of ceramic foam packing applied to distillation", Chemical Engineering Science, Oxford, GB, vol. 64, No. 11, Jun. 1, 2009, pp. 2607-2616, XP026058637.

* cited by examiner

DISTILLATION METHOD AND STRUCTURED PACKING

FIELD OF THE INVENTION

The present invention relates to a method of conducting a distillation process for separating components contained within a mixture and a cross-corrugated structured packing for use in such a process that is formed of corrugated sheets fabricated of foam-like material having a substantially open-cell structure.

BACKGROUND OF THE INVENTION

Distillation is the most widely employed separation means in the chemical industry. Distillations are conducted within distillation columns having mass transfer contacting elements such as sieve trays, structured packing and random packing. The contacting elements contact ascending and descending phases of the mixture to be separated such that the ascending vapor phase becomes richer in the more volatile components as it ascends within the column and the liquid phase becomes richer in the less volatile components as the liquid phase descends in the column. In case of air separation, in for example, a double column arrangement of high and low pressure columns connected to one another in a heat transfer relationship, the vapor phase becomes richer in nitrogen and the liquid phase becomes richer in oxygen to effect a separation between nitrogen and oxygen.

Compared to typical industrial distillation practice, cryogenic air separation is characterized by the need for tall distillation columns encased in high efficiency insulation. The high height results from both the large amount of equilibrium stages required to efficiently effect the separation and the fact that in the most common embodiment two columns are stacked one on top of the other to allow thermal integration without the need for a liquid pump. The insulation is required to minimize heat leak from the ambient which increases refrigeration energy requirements and also to prevent ingress of air which would freeze on cold surfaces.

The height required for the distillation columns used in air separation service results in a high incremental cost for the air separation plant. In order to minimize the height requirements, mass transfer contacting elements located within the distillation columns are used that deliver a high separation in a given column height. In case of trays, the high separation requirement is realized by smaller tray spacings than are typically employed in distillation columns used in separating mixtures other than air. Similarly, sheet metal, cross-corrugated structured packings with high area density are used to reduce the height that would otherwise be required for distillation columns used in air separation. One drawback to the use of high density packing is the reduction in hydraulic capacity of the packing. As a result of the reduction in hydraulic capacity, columns with larger cross sectional area are required to process a given amount of air. This increases the quantity of packing required and shell casing costs. It can also lead to shipping constraints. Further, this increase in area results in an increase of interfacial area in sheet metal packings that can result in local maldistribution of liquid between the sheets that can lead to an increase in the height of the packing required to perform a given separation over that suggested by a direct proportion with the increased area (a doubling of the interfacial area does not halve the height required for the separation).

Although, trays and structured packings, as discussed above are the most common type of mass transfer contacting elements that are used in distillation columns, monolithic elements formed of open-cell foams have also been suggested. In such a material, a network of interconnected struts defines an open network of inter connected cells. For example, in U.S. Patent Appln. Ser. No. 2010/0243520, an element is disclosed that can be used in connection with distillation. The element itself can be disc-shaped and stacked into layers within the column. Further, each element can be made up of sub-elements where it is desired to span a large column diameter in much the same manner as slices of a pie. The material making up each element can be an oxide, carbide, nitride, boride, a ceramic material, a metallic material, a polymeric material or a vapor deposition material. The type of material used can be selected to function in harsh environments and silicon carbide is a preferred material.

The effectiveness of a packing made of a foam-like material in a monolithic form within a distillation column is severely limited. This is because the hydraulic capacity of the foam to allow the countercurrent flow of liquid and vapor is low. Further, the material is prone to the promotion of maldistribution where liquid and vapor segregate across the column cross section so as to ease the countercurrent flow of the two phases. It is well known that such segregation is very detrimental to overall effectiveness of mass transfer, particularly in industrial scale columns (>0.3 m diameter).

An inherently more efficient manner of using an open cell foam is replacing the metal sheet in a conventional cross-corrugated structured packing with the foam-like material. The corrugated foam-like structure of corrugated sheets can provide an increase in wetted area versus a conventional sheet packing while also providing gross dimensions open for vapor flow and as such, provide a hydraulic capacity that is comparable or greater than a sheet metal packing of comparable surface area. Such a packing is described in Chinese Patent Application, Serial No. 101555138 A. This patent discloses a method of manufacturing a cross-corrugated structured packing formed of a silicon carbide open cell foam.

It has been determined by the inventor herein that a problem in practically using a cross-corrugated structured packing in the form described above is that the open-cell foam sheets will inherently be more resistive to vapor flow than the area between the sheets. Consequently, in such a packing, vapor will tend to flow at higher velocity outside of the foam-like material along the corrugations than within the foam matrix itself. In a sheet metal packing, the liquid film flows as films on the surface of the sheets that are exposed to the gas flowing through the corrugations. In the case of foam, liquid, below some critical liquid flux, will flow as thin films on the struts that comprise the packing and those struts that are on the interior of the foam sheet are less effective in transferring mass with the gas flowing through the corrugation than it would be in the case of a sheet metal Therefore, in order to ensure that this wetted area is effectively used and to realize separation efficiency more consistent with the wetted surface area of the packing, the packing must be designed such that that at least some minimum portion of the vapor will flow through the foam-like material itself to contact liquid film along the struts and thereby realize the potential in such a packing.

As will be discussed, the present invention provides a method of distillation and a packing for use in such a method that will characteristically operate in a manner that will ensure vapor flow through the foam-like material itself that makes up a corrugated sheet.

SUMMARY OF THE INVENTION

The present invention, in one aspect, provides a method of conducting a distillation process for separating of components contained in a mixture. In accordance with such aspect of the present invention, an ascending vapor phase of the mixture is countercurrently contacted with a descending liquid phase of the mixture within a cross-corrugated structured packing such that the descending liquid phase becomes richer in the components having a lower volatility than the components having a higher volatility and the vapor phase becomes richer in the components having the higher volatility. The cross-corrugated structured packing contains corrugated sheets fabricated of foam-like material having a substantially open-cell structure formed of a network of interconnected struts defining cells within the substantially open-cell structure. The distillation process is conducted such that the descending liquid phase produces a liquid film descending in the cross-corrugated structured packing along the struts and the vapor phase ascends within the cross-corrugated structured packing and enters the cells within the foam-like material of the corrugated sheets and contacts the liquid film. The corrugated sheets of the cross-corrugated structured packing configured such that a superficial velocity at which ambient air would flow through the cross-corrugated structured packing at a pressure drop of 0.3" wc/ft (height of water column/foot of packing) is no greater than 20 times a reference superficial velocity at which the ambient air would flow through the foam-like material making up the corrugated sheets at said pressure drop.

In another aspect the present invention provides a cross-corrugated structured packing that comprises a plurality of corrugated sheets fabricated of foam-like material having a substantially open-cell structure formed of a network of interconnected struts defining cells within the substantially open-cell structure. The plurality of corrugated sheets are configured such that a superficial velocity at which ambient air would flow through the cross-corrugated structured packing at a pressure drop of 0.3" wc/ft is no greater than 20 times a reference superficial velocity at which the ambient air would flow through the foam-like material making up the corrugated sheets at said pressure drop.

As used herein and in the claims, the term "cross-corrugated structured packing" means a structured packing having corrugations within at least a central region that is made up of corrugated sheets in which the corrugations in at least a central region are oriented at an angle and when the corrugated sheets are assembled to form the structured packing, the corrugations in adjacent sheets cross one another.

As mentioned above, in the cross-corrugated structured packing formed of the foam-like material, if the resistance to the vapor flow between the corrugated sheets making up such a packing is at a sufficiently low level, then the vapor phase will never enter the foam-like material to contact the liquid phase to any appreciable extent due to the higher resistance to flow afforded by the fine dimensions of the cell versus the dimensions of the open passages defined by the corrugations. In order to ensure that the vapor in fact flows through the packing, it must have a sufficiently open structure of cells coupled with a sufficient high resistance to flow within the structured packing such that the vapor enters the foam-like material making up the corrugated sheets. This is quantified in the present invention by comparing the superficial velocity of a flow of ambient air at a pressure drop of 0.3" wc/ft through the structured packing versus the foam-like material itself. A manner of testing the packing will be set forth herein. Preferably, as indicated above, this ratio of superficial velocity to the reference velocity is no greater than 20 and preferable no greater than 15.

In a method of the present invention, the mixture can comprise argon, oxygen and nitrogen. As such, the vapor phase becomes richer in nitrogen or argon and the liquid phase become richer in oxygen. In either aspect of the present invention, in connection with the separation of nitrogen from oxygen and/or argon from oxygen, a preferred cross-corrugated structured packing has a macro specific area in an area range of between 100 m2/m3 and 500 m2/m3, preferably in the area range of between 150 m2/m3 and 400 m2/m3. The term "macro specific area" will be defined below. Such a corrugated sheet has pores formed by the cells in at a frequency of between 30 pores per inch and 140 pores per inch and preferably at a frequency of between 40 pores per inch and 100 pores per inch and also a solids fraction in a range of between 2 percent and 20 percent. Further the corrugated sheets has a corrugation angle, in at least a central region thereof, in a corrugation angle range of between 20 degrees and 60 degrees and preferably of between 30 degrees and 50 degrees.

Each of the corrugated sheets can have a rectangular configuration and has top and bottom regions of top and bottom corrugations extending from opposed top and bottom edges and connected by central corrugations contained in the central region and oriented at the corrugation angle. The top and bottom corrugations have a corrugation angle of 90 degrees as measured from the top and bottom edges. Further, in any aspect of the present invention the foam-like material can be silicon carbide.

BRIEF DESCRIPTION OF THE DRAWINGS

While the specification concludes with claims distinctly pointing out the subject matter that Applicants regards as their invention, it is believed that the invention will be better understood when taken in connection with the accompanying drawings in which:

DETAILED DESCRIPTION

Figure 1:
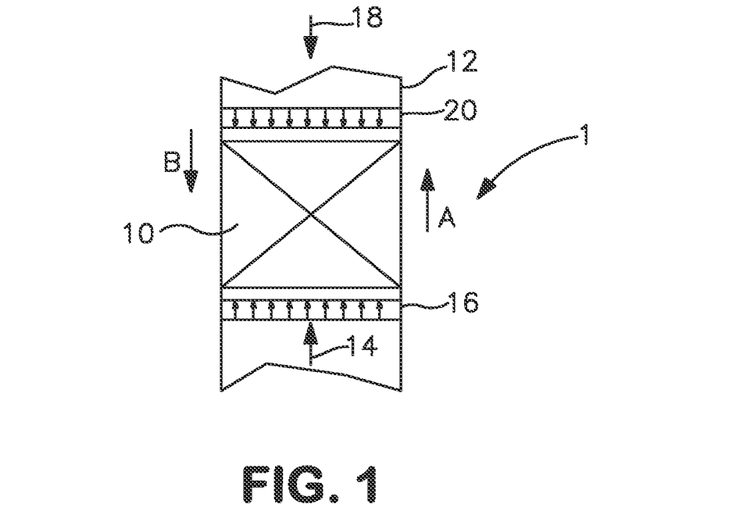
FIG. 1 is a schematic, cross sectional view of a cross-corrugated structure packing used within a column shell to carry out a method in accordance with the present invention.

With reference to FIG. 1, a column section 1 is illustrated utilizing a cross-corrugated structured packing 10 in accordance with the present invention situated within a column shell 12 which in practice would be of cylindrical configuration. The cross-corrugated structured packing 10 could be made up of bricks of structured packing in layers in the same manner as a corrugated structured packing made of sheet metal. Although not illustrated, known wall wipers would be placed at regular intervals to prevent vapor flow between such packing and the column shell 12. Also, a supporting grid would be provided to support the cross-corrugated structured packing 10 and a liquid distributor would be located above the packing to feed liquid to the bed in a uniform fashion.

As known in the art, an ascending vapor phase 14 of a mixture to be rectified enters cross-corrugated structured packing 10 from openings provided in an underlying liquid collector or liquid distributor 16 in a direction of arrowhead A and a descending liquid phase 18 is distributed to cross-corrugated structured packing 10 from openings provided in a liquid distributor 20 and flow in a direction of arrowhead B. The descending liquid phase 18 becomes richer in the components of the mixture to be rectified that have lower volatilities and the ascending vapor phase 14 becomes richer in the components having a higher volatility through contact of the phases provided by cross-corrugated structured packing 10.

In case of air separation the higher volatility component would be nitrogen or argon and the lower volatility component would be oxygen. In this regard and as well known in the art, in air separation, air is compressed, purified of higher boiling components, cooled to a temperature suitable for rectification and then rectified in a distillation column system having a high pressure column that operates at a higher pressure than a low pressure column and is integrated with the low pressure column in a heat transfer relationship. The introduction of the air into the high pressure column initiates formation of an ascending vapor phase. In the high pressure column, nitrogen is separated from oxygen and condensed against vaporization of oxygen-rich liquid produced in the low pressure column to reflux both the high and low pressure columns and thereby initiate the formation of a descending liquid phase. This produces a kettle liquid having a higher concentration of oxygen than the air in the high pressure column that is further rectified in the low pressure column to perform a further separation of nitrogen from oxygen. If argon is required an argon column can be connected to the low pressure column to separate argon from the oxygen. Consequently, in case of air separation, the cross-corrugated structured packing 10 could be located in the high pressure column, the low pressure column and the argon column either alone or with other mass transfer contacting elements such as trays or metal structured packing.

Figure 2:
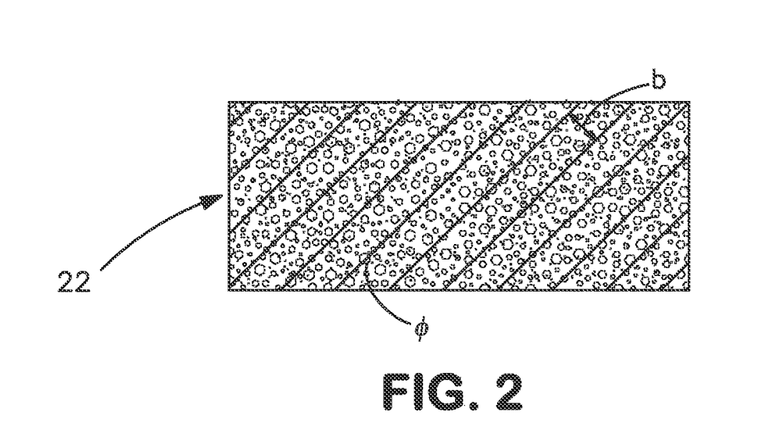
FIG. 2 is a an elevational view of a cross-corrugated structured packing in accordance with the present invention.
Figure 3:
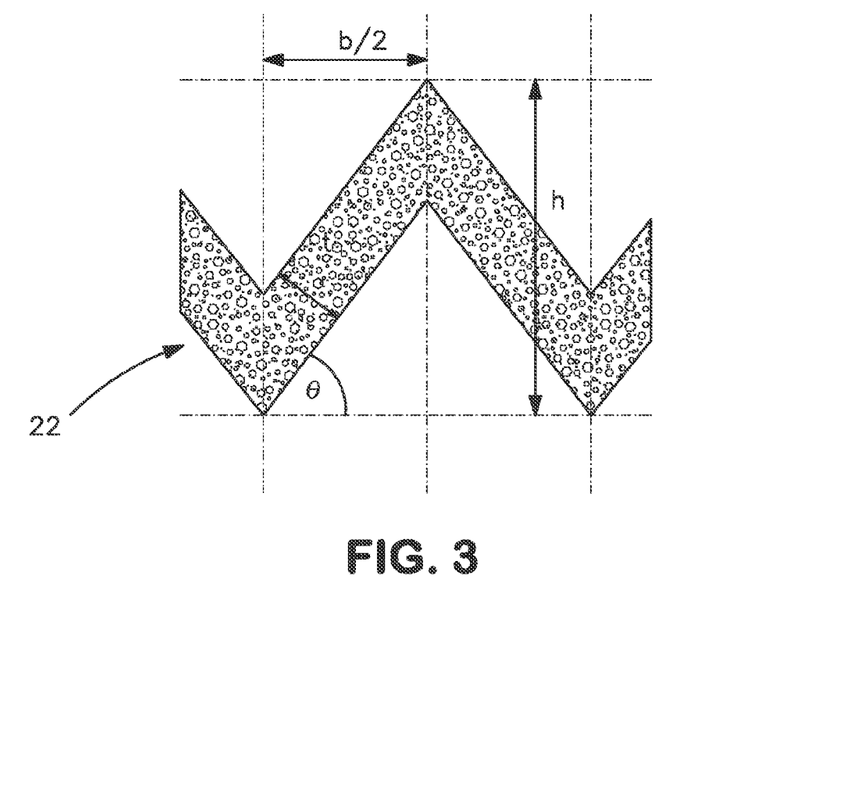
FIG. 3 is an enlarged, schematic cross-sectional view of a corrugated sheet shown in FIG. 2 as viewed with such corrugated sheet is in a vertical orientation.
Figure 4:
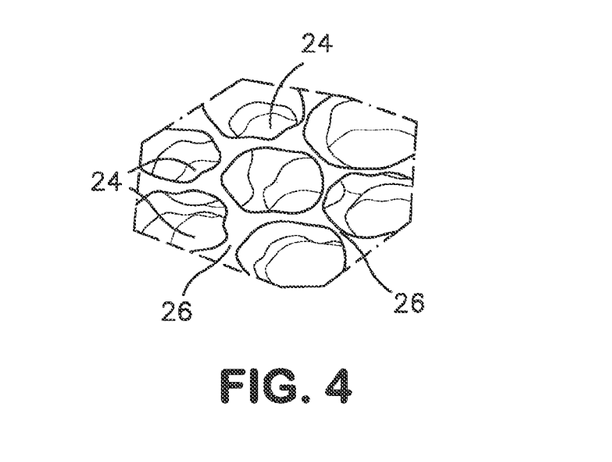
FIG. 4 is a fragmentary elevational view of a foam-like open cell material used in the fabrication of the corrugated sheet shown in FIG. 2.

With reference to FIGS. 2, 3 and 4, cross-corrugated structure packing 10 is made up of corrugated sheets 22 that are formed by a foam-like material having an open cell structure such as silicon carbide foam. It is to be noted that other types of foam could be used such as metallic foam and other ceramic foams known in the art. With particular reference to FIG. 4, such a material has cells 24 and that are defined by an interconnected network of struts 26. The structure is an "open cell" structure or in other words, as used herein and in the claims, such term means that the cells 24 are in flow communication with one another with few blind cells in such a structure. In case of cross-corrugated structured packing 10, the vapor flows into such cells in a direction along the pressure gradient and generally in a direction of Arrowhead A and the liquid flows downwardly along the struts 26 as a falling film to provide contact between the vapor and the liquid.

With particular reference to FIGS. 2 and 3, as would be known to those skilled in the art, structured packing used in air separation are typically comprised of corrugated sheets that are formed of aluminum and having a thickness of typically between 0.003 inches (0.08 mm) and 0.008 inches (0.2 mm). The corrugated sheets 22 have a similar geometric form to conventional structured packing that would be used in air separation but the base material is replaced with the foam-like material. The corrugated sheet 22 has more of a three dimensional structure than a typical corrugated sheet used in structured packing in that the thickness of the corrugated sheet 22 is defined by the extremities of the struts 26 is on average between 5 and 50 times thicker than a metal sheet used in structured packing. The foam-like material can be characterized by a number of parameters that represent the mean thickness of the struts 26, their average length and the tortuosity. The specific area of the foam-like material can be defined as the total area of the surfaces of the interconnecting struts 26 in a unit volume as m2/m3. The formation of a corrugated sheet brings with it a number of additional variables, for example, "t" the average thickness of the corrugated sheet 26, "b" the base length of the crimp 28; "h" the height of the crimp 28; "θ" the crimp angle of crimps 28 of the corrugated sheet 26 and "φ" the corrugation angle of the corrugated sheet 26 to the horizontal as viewed when the corrugated sheet 26 is placed in a vertical orientation.

The packing sheets themselves define a macro-specific area of the packing, "ap" (m2/m3), defined by the extremity of the foam sheets. Note that the macro specific area is calculated in the same manner as if the sheet defining the boundaries of the foam were a solid sheet. It does not represent a true physical surface area but does allow a ready characterization of the dimensions of the corrugated sheet.

For a given foam type (solids fraction "es" within the foam (fraction of the volume occupied by the solid), "dm" mean diameter of struts 26, "de" effective average length of the struts 26, the specific area of the foam "as", the tortuosity of the struts "χ" and the pores per inch "N"), increasing the thickness "t" of the corrugated sheet 26 that forms the cross-corrugated structured packing 10 will increase the actual effective surface area of the packing ("asp") because of the increased volume of foam and its associated surface area. The actual surface area of the cross-corrugated structured packing 10 ("asp") is a product of the foam specific area and the fraction of the packing volume occupied by the sheets and can be given by the formula:

$$asp = as * (1-ep);$$

Where "ep" is the fraction of the volume of the packing not occupied by the sheet.

Referring to FIG. 2, "ep" can be calculated by the following formula:

$$1-ep = 2t[(b/2)^2 + (h-t/\cos(\theta))^2]^{0.5/h*b}$$

Also referring to FIG. 2, the macro specific area "ap" of the cross-corrugated structured packing 10 can be calculated by the following formula:

$$ap = 4[(b/2)^2 + (h-t/\cos(\theta))^2]^{0.5/h*b}$$

The above are based on triangular crimp patterns. In practice there may be advantage to rounding of the crimps.

Figure 5:
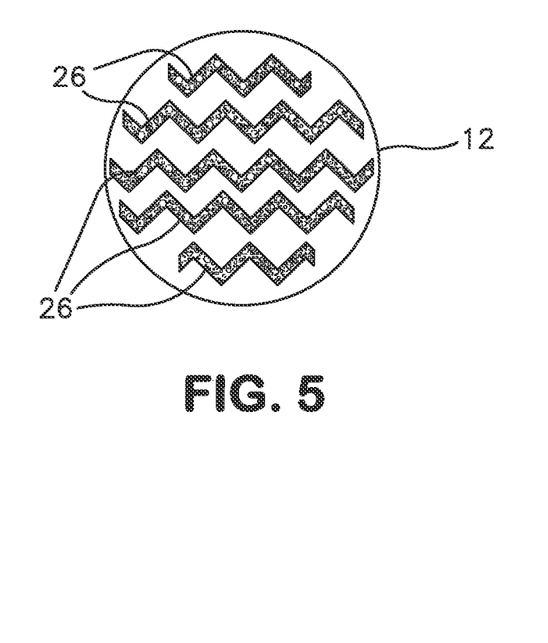
FIG. 5 is a top, schematic plan view of the cross-corrugated structured packing shown in FIG. 1.

As mentioned above, in order to more fully utilize the full surface area of the cross-corrugated structured packing 10, the geometry of the cross-corrugated structured packing 10 as viewed in the foam-like material itself and also, the crossing corrugated structure provided by the corrugated sheets 22, has to be chosen to force a significant portion of the vapor to pass through the foam matrix itself. To assist in the understanding of this, consider a horizontal section taken through the column shell 10 as shown in FIG. 5. Some of this plan area is free space defined by the corrugations of corrugated sheets 22 that are arranged in a cross corrugated fashion. Part of the area will be taken up by the foam. From the earlier definitions, the average fraction of the plan area that is not occupied by the foam will be equal to the packing porosity, "ep". When vapor is flowing through this section, some of the vapor will travel in the open area and some within the interstices of the foam-like material of the corrugated sheets. Due to the nature of the foam-like material, the foam-like material presents greater resistance to flow than the open channel and therefore, the velocity of the vapor in the open area will be greater than the velocity within the foam-like material of the corrugated sheet 22. A means to increase the flow of vapor through the foam-like material is to reduce the packing open area "ap" and also to increase the permeability of the foam-like material by increasing the average cell size or reducing the solids volume fraction.

The relative proportion of gas that flows within the packing sheet versus the open channel is a function of a great many variables including: "es", "dm", "de", "θ" "h", "b", "φ" and "t". In practice the three dimensional nature of the reticulated foam structure is such that it is difficult to fully characterize such structure with a small number of variables. A convenient way to characterize the cross-corrugated structured packing 10 that accounts for all these variables is to compare the superficial velocity of vapor through a monolith consisting of the foam-like material as a reference superficial velocity versus the superficial velocity of vapor through the cross-corrugated structured packing 10 utilizing the same foam-like material of the monolith, at an equivalent pressure gradient. The practical gradient that is applicable to most distillation processes is 0.3" wc/ft and the system used a simple air system operating at ambient conditions, chosen such that the column would be close to a typical design point in distillation service where liquid would be irrigating the packing. As indicated above, the ratio of the velocities at an equivalent pressure gradient of 0.3" wc/ft between the monolith and the cross-corrugated structured packing 10 should be no greater than 20 and preferably no greater than 15. In so doing, the fraction of vapor that will pass through the foam-like material making up the corrugated sheet 22 in a typical distillation process will be greater than 1% and even greater than 3% and that this convective flow through the foam structure will ensure that the wetted surface area in the interior of the foam structure is effective in mass transfer.

In practice, in order to make a cross-corrugated structured packing in accordance with the present invention, dry pressure drop correlations for sheet metal packings with the same macro surface area (fraction packing, corrugation angle, corrugation height and etc.) can be used to predict the velocity of gas in the open channels at which the dry pressure drop of 0.3" wc/ft (245 Pa/m) is attained. The prior art abounds with references containing such correlations. One example is 39 Ind. Eng. Chem Res., page 1788 by Fair (2000). Similarly, dry pressure drop correlations for the flow of gas within foams can be found in the literature and used to calculate the velocity at a given pressure gradient. One example can be found in 64 Chemical Engineering Science, Issue 11, pages 2607-2616 by Lévêque et al. (June 2009). The cross-corrugated packing can then be tested as described above to make certain that it functions such that a ratio of superficial velocities between the structured packing such as cross-corrugated structured packing 10 and the monolithic foam are in the ratio of no greater than 20 and preferably no greater than 15.

Figure 6:
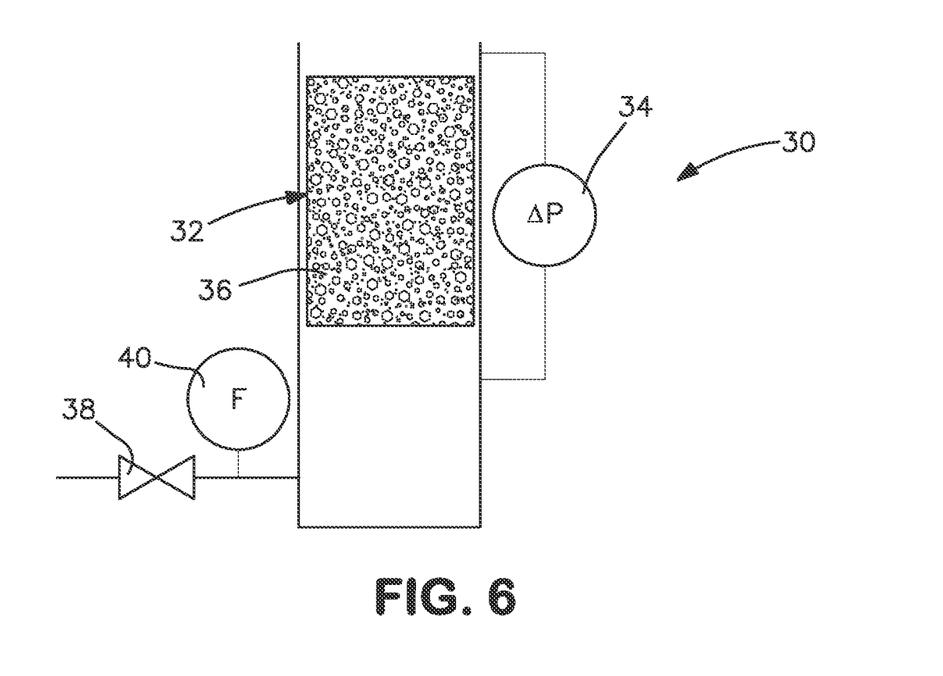
FIG. 6 is a test column that is used to test a characterization of the cross-corrugated structured packing in accordance with the present invention.

A test system that can be utilized for purposes that have been described directly above is shown in FIG. 6.

This test is most simply done with an air system 30 using a column 32 that is a minimum of 4" (0.1 m) in diameter but preferably 12" (0.3 m) or greater so as to minimize the impact of the wall. Wall wipers that effective block vapor passage between the packing and the column shell should be placed at regular intervals, typically at least every 4 inches in height. The height of the packing elements to be tested is preferably 1 foot in height or greater. Measurements are taken of the pressure drop by a suitable pressure differential meter 34 of both a monolith of foam-like material and a cross-corrugated structured packing under investigation that are both generally shown by reference number 36 versus the air velocity. Where air is available at pressure, the air is throttled through a valve 38 and metered by a flow meter 40 then fed to the base of a column that contains the packing. The superficial velocity is determined by dividing the volumetric flow measured by the flowmeter by the cross section of the column. Alternative measurement would be to directly measure through use of a pitot tube.

It has been calculated by the inventor herein that cross-corrugated structure packings such as cross-corrugated structured packing 10 that are suitable for air separation service in either the high or low pressure columns or the argon column will have: a macro specific area in an area range of between 100 m2/m3 and 500 m2/m3 and preferably in an area range 150 m2/m3 and 400 m2/m3; pores at opposed surfaces of each of the corrugated sheets formed by the cells in at a frequency of between 30 pores per inch and 140 pores per inch and preferably between 40 pores per inch and 100 pores per inch; a solids fraction in each of the corrugated sheets in a solids fraction range of between 2 percent and 20 percent; and a corrugation angle in each of the corrugated sheets 22 in a corrugation angle range of between 20 degrees and 60 degrees and preferably between 30 degrees and 50 degrees.

A cross-corrugated structured packing formed of metal and in accordance with the prior art will typically have a density of 700 $m^2/m^3$ and corrugation angle 45 degrees. In a cross-corrugated structured packing in accordance with the present invention where the goal is to maintain height but reduce diameter, such as when facing shipping constraints or retrofitting a column for more capacity, it has been calculated by the inventor here in that such a packing should incorporate a corrugated sheet having 80 pores per inch, an "ep" of 80%; an "as" of 250 $m^2/m^3$; and a corrugation angle of 45 degrees. Such a packing has been calculated as providing an additional capacity of above 10% over the prior art sheet metal packing having the density of 700 $m^2/m^3$. Where the goal is to reduce package height a cross-corrugated structured packing in accordance with the present invention will have a 100 pores per inch, an "ep" of 70% and an "as" of 400 $m^2/m^3$. Such a packing will reduce the height by up to 50 percent, but with the same capacity as a prior art sheet metal structured packing having the density of 700 $m^2/m^3$.

Preferentially, the foam-like material will be configured in a substantially open cell structure with few of any cells being closed. Some ceramic or metallic foam-like materials will have a greater fraction of the cells closed. This will reduce the efficiency of the packing and the pressure drop will be greater in a cross-corrugated packing using such a foam-like material as the fraction of the cells in the structure are closed.

Figure 7:
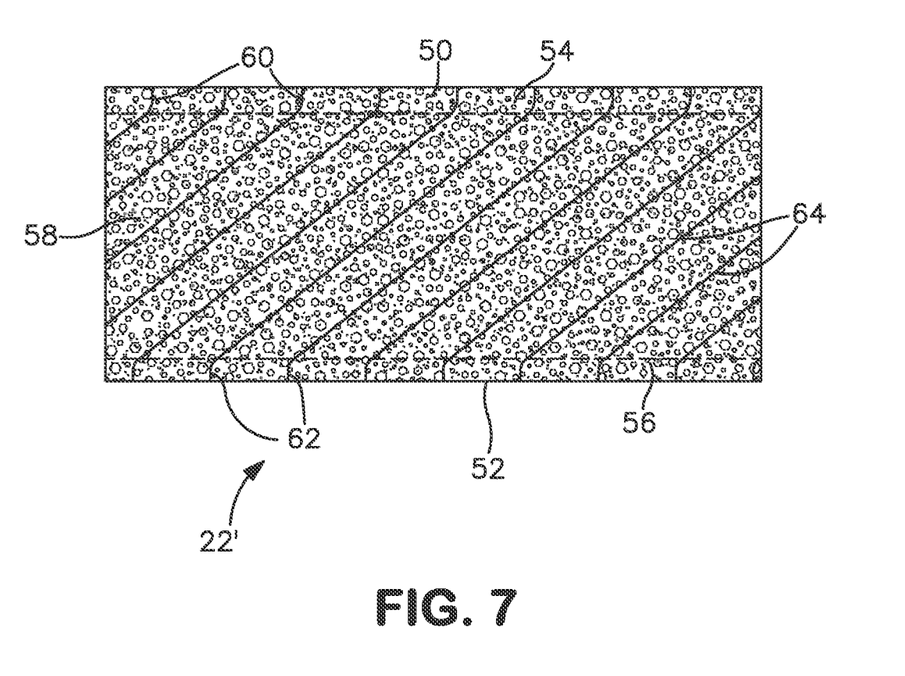
FIG. 7 is a modified version of a corrugated sheet used in a cross-corrugated structured packing in accordance with the present invention.

It is known that cross corrugated structured packings will preferentially flood at the interface between layers of packings. The capacity can be increased by lowering the resistance to gas flow at the interface and particularly at the base of the packing layer. This may be done in a number of means in a sheet metal packing. One such means, is illustrated in connection with a corrugated sheet 22' shown in FIG. 7 that could be used to form a cross-corrugated structured packing in accordance with the present invention. Corrugated sheet 22' is formed of an open cell foam-like material such as has been described above. Corrugated sheet 22' has a top edge 50 and a bottom edge 52 and is provided with a top region 54, a bottom region 56 and a central region 58, all as viewed when the corrugated sheet 22' is placed in a vertical orientation such as in a distillation column. The corrugations 60 and 62 extending from the top and bottom edges 50 and 52, respectively, are connected by central corrugations 64 contained in the central region 58 and have a corrugation angle of 90 degrees as measured from the top and bottom edges 50 and 52. The central corrugations 64 will be, in case of air separation, within the angle ranges given above. Another method of increasing capacity would be to reduce the thickness of a corrugated sheet in accordance with the present invention in the vicinity of the interface between 10 percent and 80% of the thickness in the central region of the packing sheets. Additionally, another method of increasing capacity would be to increase the porosity in the vicinity of the interface by at least 5% and preferably by greater than 10%.

While the present invention has been described with reference to preferred embodiments, as will occur to those skilled in the art numerous changes, additions and omissions can be made without departing from the spirit and scope of the invention as set forth in the presently pending claims.

The invention claimed is:

1. A method of conducting a distillation process for separating of components contained in a mixture comprising:

countercurrently contacting an ascending vapor phase of the mixture with a descending liquid phase of the mixture within a cross-corrugated structured packing such that the descending liquid phase becomes richer in the components having a lower volatility than the components having a higher volatility and the vapor phase becomes richer in the components having the higher volatility;

the cross-corrugated structured packing containing corrugated sheets having a thickness of between 0.4 mm to 10 mm and fabricated of foam material having an open-cell structure formed of a network of interconnected struts defining cells within the open-cell structure and wherein the foam material has a macro specific area in an area range of between 100 m2/m3 and 500 m2/m3, pores at opposed surfaces of each of the corrugated sheets formed by the cells in at a frequency of between 30 pores per inch and 140 pores per inch, a solids fraction in each of the corrugated sheets in a solids fraction range of between 2 percent and 20 percent;

conducting the distillation process such that the descending liquid phase produces a liquid film descending in the cross-corrugated structured packing along the struts and the vapor phase ascends within the cross-corrugated structured packing and enters the cells within the foam material of the corrugated sheets and contacts the liquid film; and the corrugated sheets of the cross-corrugated structured packing configured such that a superficial velocity at which ambient air would flow through the cross-corrugated structured packing at a pressure drop of 0.3"wc/ft is no greater than 20 times a reference superficial velocity at which the ambient air would flow through the foam material making up the corrugated sheets at said pressure drop.

2. The method of claim 1, wherein the superficial velocity is no greater than 15 times the reference superficial velocity.

3. The method of claim 1, wherein the mixture comprises argon, oxygen and nitrogen, the vapor phase becomes richer in nitrogen or argon and the liquid phase become richer in oxygen.

4. The method of claim 3, wherein the cross-corrugated structured packing has a corrugation angle in each of the corrugated sheets in a corrugation angle range of between 20 degrees and 60 degrees.

5. The method of claim 3, wherein the cross-corrugated structured packing has a macro specific area in an area range of between 150 m2/m3 and 400 m2/m3, pores at opposed surfaces of each of the corrugated sheets formed by the cells in at a frequency of between 40 pores per inch and 100 pores per inch, a solids fraction in each of the corrugated sheets in a solids fraction range of between 2 percent and 20 percent and a corrugation angle in each of the corrugated sheets, in at least a central region thereof, in a corrugation angle range of between 30 degrees and 50 degrees.

6. The method of claim 4 or claim 5, wherein each of the corrugated sheets is of rectangular configuration and has top and bottom regions of top and bottom corrugations extending from opposed top and bottom edges and connected by central corrugations contained in the central region and oriented at the corrugation angle, the top and bottom corrugations having a corrugation angle of 90 degrees as measured from the top and bottom edges.

7. The method of claim 6, wherein the foam material is formed of silicon carbide.

8. The method of claim 1, wherein the foam material is formed of silicon carbide.

* * * * *